Oct. 14, 1947.     S. BATTILANI     2,429,116
COFFEE PERCOLATOR
Filed July 16, 1945
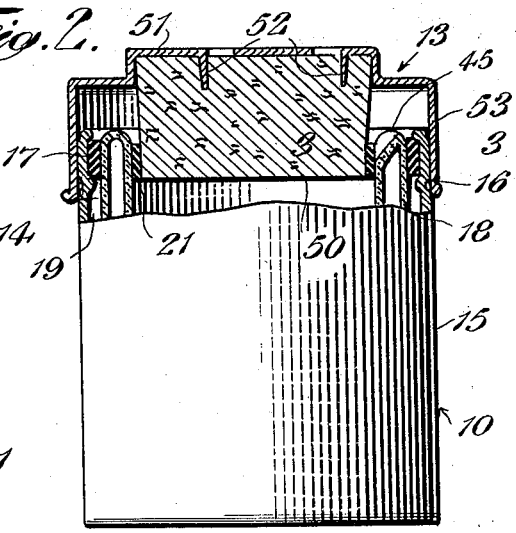
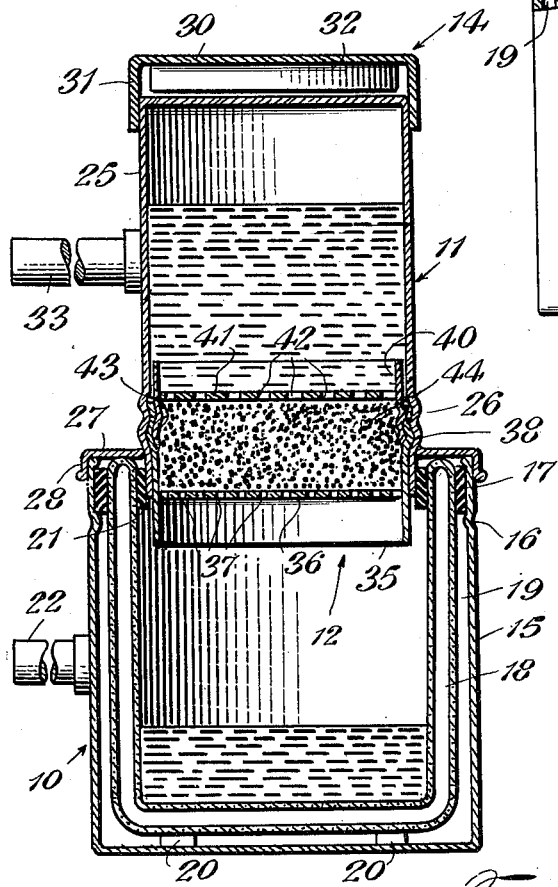
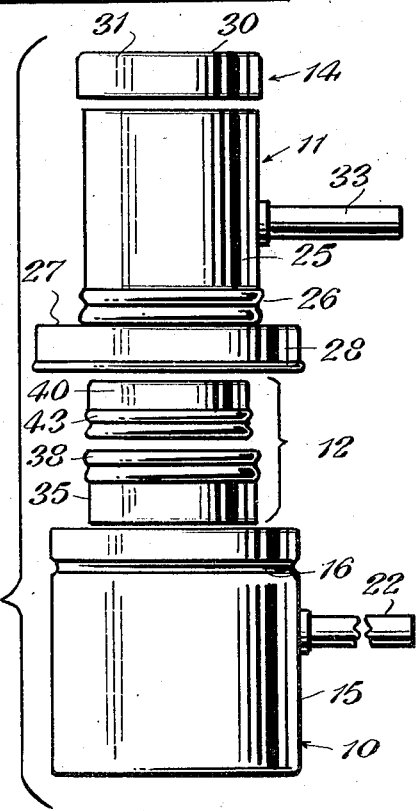
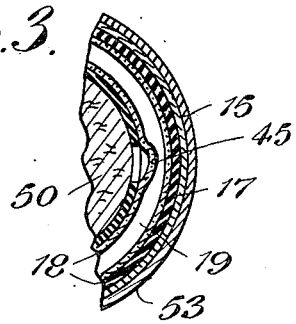
INVENTOR
STEFANO BATTILANI
BY
ATTORNEY Patented Oct. 14, 1947

2,429,116

UNITED STATES PATENT OFFICE 2,429,116

COFFEE PERCOLATOR

Stefano Battilani, New York, N. Y.

Application July 16, 1945, Serial No. 605,237

1 Claim. (Cl. 99—296)

This invention relates to a coffee percolator.

One of the objects of the invention is to provide a container for the coffee in which after the coffee has been percolated it will retain its heat for a considerable time.

Other objects are to provide a percolator which is neat looking in appearance; one in which the parts are economically manufactured and one that is efficient in the production of excellent coffee.

Other advantages will be apparent as the specification proceeds. Referring to the drawings forming a part thereof:

Fig. 1 is a longitudinal sectional view;

Fig. 2 is a view of the coffee receptacle partly in section and partly in elevation and showing a closure applied thereto;

Fig. 3 is a fragmentary detail sectional view taken on line 3—3 of Fig. 2; and

Fig. 4 is an exploded elevational view on a smaller scale.

Referring again to the drawings the reference numeral 10 designates the coffee receptacle, 11 the water receptacle, 12 the ground coffee container, 13 the closure and 14 an electrical heating element.

The coffee receptacle comprises an outer shell 15 having an inwardly extending annular bead 16 formed thereon. This bead supports a packing ring 17 which is interposed between the wall of the shell 15 and the outer wall of a heat insulated vessel 18 of the thermos type. To further aid in retaining the heat an air space 19 is provided between the thermos unit 18 and the shell 15. Other types of heat insulating for the coffee container than the thermos unit and air space may be employed. The bottom of the outer wall of the thermos unit 18 is carried by and separated from the bottom of the shell 15 by pads 20 suitably secured to the bottom wall of the shell 15, thus maintaining the air space in its entirety between the thermos unit 18 and the shell 15. A packing ring 21 insures a tight fit between the coffee receptacle and the water receptacle, hereinafter described. The coffee receptacle is provided with a handle 22 suitably insulated from the shell 15.

The water receptacle comprises a container 25 having rolled threads 26 at its lower end as viewed from Fig. 1. The container 25 extends below the threads 26 into engagement with the packing ring 21 and thus insures against any possibility of leakage while the water is passing from the water receptacle to the coffee receptacle. Below the threads 26 there may be an outwardly extending flange 27 welded or otherwise secured to the container 25. The flange 27 may have a skirt 28 depending therefrom to take over the shell 15 of the coffee container.

A plate 30 having a flange 31 is adapted to fit over the top of the water receptacle as viewed from Fig. 1. Attached to the plate 30 is an electrical heat unit 32. The electrical heating unit may be utilized when desired to heat the water in the container 25. However if an electric plate or gas burner is more convenient the plate 30 and its heating unit may be removed from the container and the container placed directly on the electric plate or gas burner. It might also be more convenient to bring the water to a boiling temperature in a separate utensil and in this event the electrical heating unit may or may not be removed as desired.

The flange 27 insures the proper positioning of the water receptacle in relation to the coffee receptacle. The skirt 28 prevents any wobbling or canting of the water receptacle when positioning it in relation to the coffee receptacle so as to insure against the glass thermos unit being damaged. The container 25 is provided with a handle 33 which is suitably insulated from the container. If desired the container 25 might also be of a double wall construction or heat insulated in any well known or conventional manner.

The ground coffee container 12 is of two part construction. The lower part 35 as viewed from Fig. 1 is closed by a plate 36 having a plurality of fine perforations 37. The upper end of the lower part of the coffee container is provided with rolled threads 38 which cooperate with the rolled threads 26 on the lower part of the water container 25. The cooperating threads 38 and 26 guarantee the proper positioning of the coffee container in relation to the water container and also insure against any possibility of the coffee container slipping into the water container when the parts are in the reverse position of Fig. 1.

The upper part 40 of the coffee container is a cylindrical shell and its upper end is closed by a plate 41 having perforations 42 which are comparatively large in relation to the perforations 37 in the plate 36. The lower portion of the shell 40 has rolled threads 43 which cooperatively engage the threads 38 on the lower part 35 of the ground coffee container. The ground coffee 44 is confined between the perforated plates 36 and 41. The foregoing makes for a strong and rigid construction as the fact of the two parts of the ground coffee container being threaded together precludes any possibility of the two portions of the container separating due to the swelling of the ground coffee when the water passes through it.

If desired the inner wall of the thermos unit may be provided with an indentation 45 as illustrated in Figs. 2 and 3. This indentation aids in pouring the coffee and will function as a vent.

After the coffee has been brewed and it is desirable to keep it hot for a time the water receptacle 11 with its ground coffee container 12 is removed from the coffee receptacle 10 and the closure 13 is applied thereto. The closure 13 comprises a cork 50 which is held in a pocket in a cover member 51 by prongs 52 struck from the cover member. The cover member is provided with a depending skirt 53 which takes over the shell 15 of the coffee container.

In making coffee the two parts of the ground coffee container 12 are separated, the ground coffee placed therein and the two parts are threaded together. The water receptacle 11 is reversed from the position shown in the drawings and the required amount of water is poured into the receptacle. The water may be brought to a boiling point by the electrical heating unit 14 or the unit 14 removed and the water brought to a boiling point by some other heating medium. At this time the ground coffee container may or may not be positioned in the mouth of the water receptacle. As heretofore stated the water may be boiled in some other utensil and poured into the water receptacle. After the water has been brought to a boil the coffee receptacle is placed over the water receptacle the handles 22 and 33 are grasped and the percolator is reversed to the position shown in Fig. 1. If desired the coffee receptacle might be positioned over the water receptacle while the water is being brought to a boil. After the percolator has been reversed to the position of Fig. 1 the water slowly seeps through the ground coffee and the fine perforations 37 in the plate 36 are so arranged that the maximum amount of flavor and aroma is extracted from the ground coffee. As heretofore stated if it is desired to keep the coffee heated the closure 13 is applied to the coffee receptacle.

Changes in details of construction such as would occur to one skilled in the art are to be considered as coming within the spirit of the invention as set forth in the appended claim.

I claim:

A coffee maker including a coffee receptacle having an open top and a rim portion extending around the open top, a water receptacle open at the bottom and having a lower portion that fits into the open top of the coffee receptacle and that is held in the rim so that the two receptacles are connected together for movement as a unit, said water receptacle having imperforate sides and being closed at its upper end by an imperforate end wall that is integral with said sides, a ground coffee container comprising a side wall and perforated end walls, one of which is movable toward and from the other to confine the coffee within the container under a controlled pressure, means for preventing the end walls of the coffee container from moving apart when the coffee maker is in use, the coffee receptacle being large enough to form a partition across the entire cross section of the water receptacle so that the only communication between the coffee receptacle and the upper portion of the water receptacle is through the perforations of the coffee container and through the ground coffee within said container, means for positively holding the coffee container against displacement either upwardly or downwardly in the water receptacle, said means comprising an indentation in the inside wall of the water receptacle and a projection on the outside of the coffee container that fits into said indentation, said indentation being provided by an outwardly displaced portion of the wall of the water receptacle, which portion gives the outside of the water receptacle an increased diameter at the displaced portion, said increased diameter being larger than the cross section of the opening in the coffee receptacle into which the lower portion of the water receptacle fits, the means for preventing movement of the coffee container end walls comprising cam means for adjustably positioning one end wall of the coffee container with respect to the other to maintain a controlled pressure on the coffee grounds within the container and heat insulating means surrounding at least the coffee receptacle for keeping the coffee and the coffee receptacle warm while the water receptacle is uppermost and hot water is seeping through the coffee container from the unvented water receptacle above.

STEFANO BATTILANI.

REFERENCES CITED

The following references are of record in the file of this patent:

UNITED STATES PATENTS

| Number | Name | Date |
|---|---|---|
| 211,236 | Hartman | Jan. 7, 1879 |
| 264,721 | Maybury | Sept. 19, 1882 |
| 450,208 | Wheelwright | Apr. 14, 1891 |
| 837,834 | Herrera | Dec. 4, 1906 |
| 843,727 | White | Feb. 12, 1907 |
| 892,846 | Jorgensen | July 7, 1908 |
| 980,088 | Flatau | Dec. 27, 1910 |
| 992,053 | Pike | May 9, 1911 |
| 1,001,496 | Zimmerman | Aug. 22, 1911 |
| 1,489,893 | Malcamp | June 24, 1924 |
| 1,499,281 | Altieri | June 24, 1924 |

FOREIGN PATENTS

| Number | Country | Date |
|---|---|---|
| 13,842 | France | May 3, 1911 |
| | (Addition to No. 423,548) | |
| 351,364 | France | July 13, 1905 |
| 469,992 | Germany | Jan. 2, 1929 |
| 540,273 | Germany | Mar. 7, 1935 |
| 588,895 | France | Feb. 11, 1925 |
| 795,815 | France | Jan. 13, 1936 |